United States Patent

(12) United States Patent
Zhang

(10) Patent No.: US 10,838,256 B2
(45) Date of Patent: Nov. 17, 2020

(54) ULTRA-THIN BACKLIGHT LENS

(71) Applicant: SHENZHEN MINGZHI ULTRA PRECISION TECHNOLOGY CO., LTD., Shenzhen (CN)

(72) Inventor: Zhicai Zhang, Shenzhen (CN)

(73) Assignee: SHENZHEN MINGZHI ULTRA PRECISION TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/378,548

(22) Filed: Apr. 8, 2019

(65) Prior Publication Data
US 2019/0235319 A1 Aug. 1, 2019

Related U.S. Application Data

(63) Continuation of application No. PCT/CN2017/073762, filed on Feb. 16, 2017.

(30) Foreign Application Priority Data

Nov. 23, 2016 (CN) .................... 2016 2 1258811 U
Nov. 23, 2016 (CN) .................... 2016 2 1258812 U

(51) Int. Cl.
G02F 1/13357 (2006.01)
F21V 5/04 (2006.01)
G02F 1/1335 (2006.01)

(52) U.S. Cl.
CPC .......... *G02F 1/133606* (2013.01); *F21V 5/04* (2013.01); *G02F 1/133526* (2013.01);
(Continued)

(58) Field of Classification Search
CPC ................. F21V 5/04; G02F 1/133526; G02F 2001/133607
See application file for complete search history.

(56) References Cited

U.S. PATENT DOCUMENTS 6,724,543 B1 * 4/2004 Chinniah ............... G02B 13/18
359/718
8,585,239 B1 * 11/2013 Tseng ........................ F21V 5/04
362/244
(Continued)

FOREIGN PATENT DOCUMENTS

CN 103388776 A 11/2013
CN 203907479 U 10/2014
(Continued)

OTHER PUBLICATIONS

International Search Report for PCT/CN2017/073762.

*Primary Examiner* — Alexander K Garlen

(57) ABSTRACT

An ultra-thin backlight lens includes: a lens body, which including a light exit top face and a light reflection bottom face that are horizontally arranged, and a light exit side face vertically arranged, the light exit side face being connected to the light exit top face and the light reflection bottom face, a light source mounting hole being arranged at a center, of the light reflection bottom face, an inner wall of the light source mounting hole being a light incident face, which being connected to the light reflection bottom face; wherein a light exit convex point and a light incident convex point are arranged at a center of the light incident face, and the light exit top face being provided with a plurality of light transmission holes. The light transmission holes allow a part of the light to emit to adjust the luminance of the central region.

9 Claims, 3 Drawing Sheets

(52) U.S. Cl.
CPC .............. *G02F 1/133603* (2013.01); *G02F 2001/133607* (2013.01)

(56) References Cited

U.S. PATENT DOCUMENTS

| | | | |
|---|---|---|---|
| 2006/0238884 A1* | 10/2006 | Jang | F21V 5/04 359/653 |
| 2014/0169031 A1* | 6/2014 | Lin | F21V 5/04 362/606 |
| 2015/0029728 A1 | 1/2015 | Hu et al. | |
| 2016/0300986 A1* | 10/2016 | Jeong | G02B 6/00 |
| 2016/0327239 A1* | 11/2016 | Lin | G02B 5/0231 |

FOREIGN PATENT DOCUMENTS

| | | | |
|---|---|---|---|
| CN | 205354578 | U | 6/2016 |
| JP | 2010-165683 | A | 7/2010 |
| JP | 2010186142 | A | 8/2010 |
| JP | 2014-22126 | A | 2/2014 |
| JP | 2015-507350 | A | 3/2015 |
| TW | I479107 | B | 4/2015 |
| WO | 2016158243 | A | 10/2016 |

* cited by examiner

ULTRA-THIN BACKLIGHT LENS

CROSS-REFERENCE TO RELATED APPLICATIONS

This application is a continuation of International Patent Application No. PCT/CN2017/073762, with an international filing date of Feb. 16, 2017, designating the United States, now pending, which is based on Chinese Patent Applications No. 201621258811.2 and No. 201621258812.7, filed on Nov. 23, 2016. The contents of these specifications are incorporated herein by reference.

TECHNICAL FIELD

The present invention relates to the technical field of lens, and in particular, relates to an ultra-thin backlight lens.

BACKGROUND

A liquid crystal television generally employs a direct illumination-type LED backlight as a light emitting source at the rear of a liquid crystal panel. The direct illumination-type LED backlight is generally formed by an LED lamp and a lens. The lens may enable the LED lamp to irradiate light uniformly, such that the liquid crystal panel has a uniform luminance, and image quality of the liquid crystal television is further improved.

Since the LED lamp is generally arranged at a center of the lens, when the light is emitted from the lens, the light emitted from the center thereof has a high intensity. As a result, it is bright at the center, but dark at the surroundings. Accordingly, luminance is not uniformly distributed. For the sake of avoiding non-uniform distribution of the luminance of the direct illumination-type LED backlight, an irradiation distance generally needs to be defined between the lens and the liquid crystal panel, such that the light is further diverged and the luminance is uniformly distributed. A traditional irradiation distance is typically 15 to 35 mm.

With constant development of the liquid crystal televisions, people are more and more devoted to buying thinner liquid crystal televisions. The irradiation distance and lens thickness are important factors determining the thickness of the liquid crystal televisions.

SUMMARY

In view of the above technical problem, the present invention is intended to provide a backlight lens which achieves uniform light divergence and has a small thickness.

The present invention employs the following technical solution:

An ultra-thin backlight lens includes: a lens body rotatably symmetric along a central axis, the lens body comprising a light exit top face and a light reflection bottom face that are horizontally arranged, and a light exit side face vertically arranged, an upper edge and a lower edge of the light exit side face being respectively connected to an outer edge of the light exit top face and an outer edge of the light reflection bottom face, a light source mounting hole being arranged at a center of the light reflection bottom face, an inner wall of the light source mounting hole being a light incident face, a lower edge of the light incident face being connected to an inner edge of the light reflection bottom face; wherein a light exit convex point protruding upwards is arranged at a center of the light exit top face, a light incident convex point protruding downwards is arranged at a center of the light incident face, and a light reflection coating is coated on a surface of a central region of the light exit top face, the light reflection coating being provided with a plurality of light transmission holes.

Further, surfaces of the light exit convex point and the light incident convex point are all arc-shaped.

Further, the light exit convex point is covered by the light reflection coating or inserted into the light transmission holes.

Further, the light reflection coating has a shape rotatably symmetric relative to a position of the light transmission holes about the center of the light exit top face.

Further, an arc, shaped recess portion is arranged at the center of the light exit top face.

Further, the light exit side face is formed by a plurality of light exit flat faces and a plurality of light exit arc faces that are joined in an end-to-end fashion.

Further, the light reflection bottom face is provided with a plurality of Fresnel annular grooves with the center of the light reflection bottom face as a center of circle, a sparking texture being arranged on surfaces of the Fresnel annular grooves.

Further, the light incident face is formed by a light incident top face and a light incident side face, an upper edge and a lower edge of the light incident side face being respectively connected to an outer edge of the light incident top face and an inner edge of the light reflection bottom face; and the light incident convex point is arranged at a center of the light incident top face.

Further, the light exit top face is provided with a mounting blind hole, the light exit side face is provided with a mounting step, and the light reflection bottom face is provided with a mounting leg.

The following beneficial effects are achieved:

According to the present invention, (1) the light incident convex point and the light exit convex point are arranged, and the light penetrating through the center of the lens body diverges by refraction, which prevents over-great luminance at the center of the lens body: (2) the light reflection coating reduces through reflection the intensity of the light penetrating through the center of the lens body and the light transmission holes allow a part of the light to emit to adjust the luminance of the central region; (3) the Fresnel annular grooves reduce the unnecessary free curved surface of the light reflection bottom face and are horizontally arranged, such that the thickness of the lens body is reduced; (4) the sparking texture is used for treating the stray light, such that the lens projects or emits uniform light spots; (5) the arc-shaped recess portion, the light exit arc face, the light incident top face and the light incident side face are arranged, such that the light is further refracted and the angle at which the light is emitted is even greater; (6) the irradiation distance of the lens body is 6 mm; and (7) cooperation of the light exit convex point and the arc-shaped recess portion reduces the unnecessary free curved surface of the light exit top face and the light exit convex point and the arc-shaped recess portion are horizontally arranged, such that the thickness of the lens body is reduced.

Figure 1:
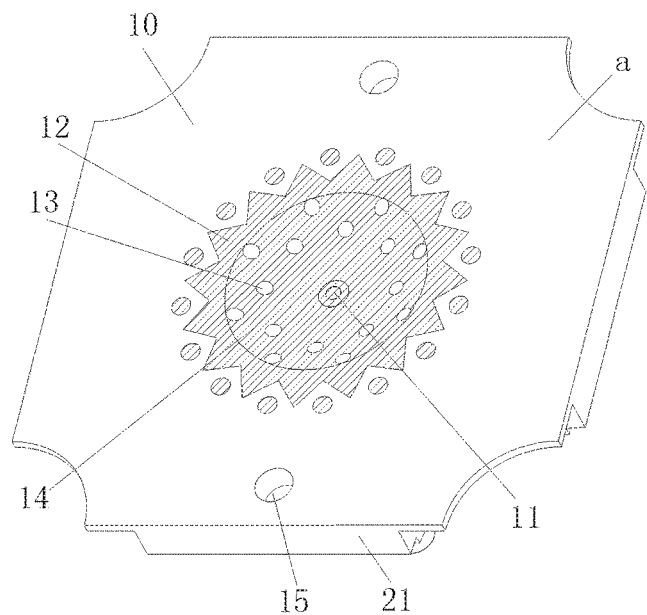
FIG. 1 is a three-dimensional view of an ultra-thin backlight lens according to an embodiment of the present invention.
Figure 2:
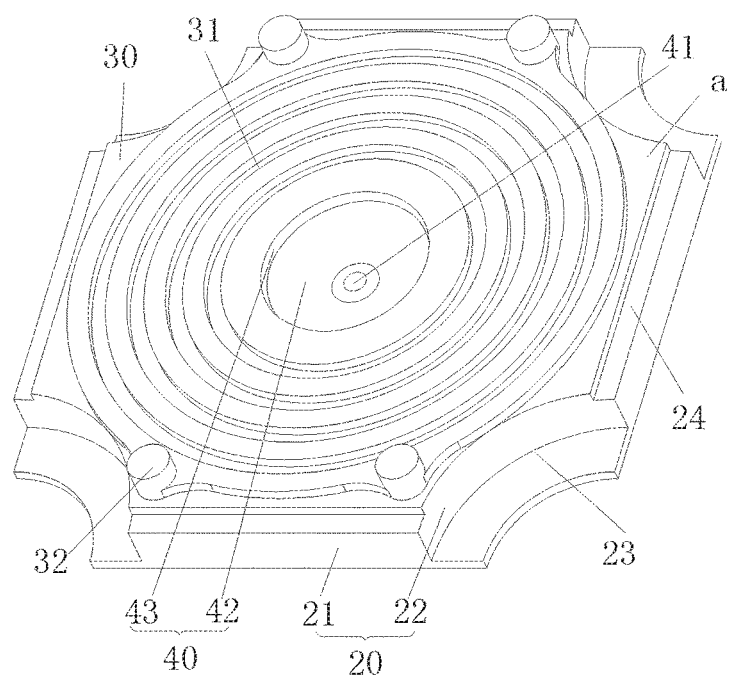
FIG. 2 is a three-dimensional view (taken from another angle) of the ultra-thin backlight lens according to an embodiment of the present invention.
Figure 3:
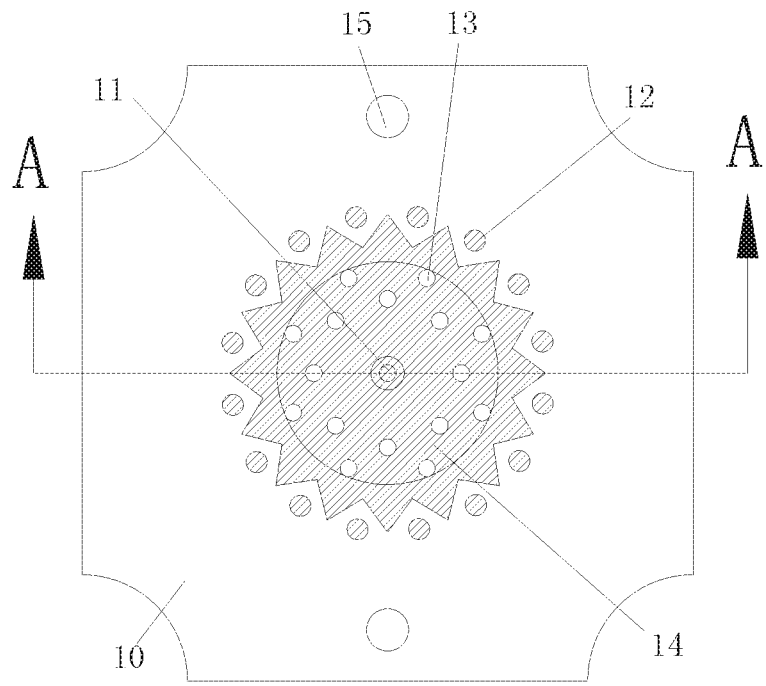
FIG. 3 is a top view of the ultra-thin backlight lens according to an embodiment of the present invention.
Figure 4:
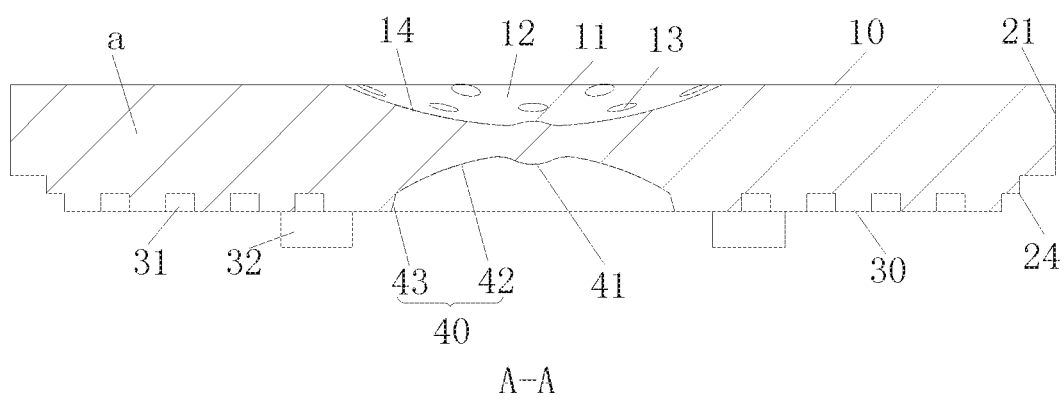
FIG. 4 is a sectional view taken along a A-A side in FIG. 3.

Reference numerals and denotations thereof:
10: light exit top face;
11: light exit convex point;
12: light reflection coating;
13: light transmission hole;
14: arc-shaped recess portion;
15: mounting blind hole;
20: light exit side face;
21: light exit flat face;
22: light exit arc face;
23: positioning step;
24: mounting step;
30: light reflection bottom face;
31: Fresnel annular groove;
32: mounting leg;
40: light incident face;
11: light incident convex point;
42: light incident top face;
43: light incident side face;
a: lens body;
b: PCB board; and
c: LED lamp.

DETAILED DESCRIPTION

To make the objectives, technical solutions and advantages of the present invention clearer, hereinafter the present invention is further described in detail with reference to the accompanying drawings.

As illustrated in FIGS. 1 to 4. an embodiment of the present invention provides an ultra-thin backlight lens. The ultra-thin backlight includes a lens body a symmetric along a central axis. The lens body a includes a light exit top face 10 and a light reflection bottom face 30 that are horizontally arranged, and a light exit side face 20 vertically arranged. An upper edge and a lower edge of the light exit side face 20 are respectively connected to an outer edge of the light exit top face 10 and an outer edge of the light reflection bottom face 30. A light source mounting hole is arranged at a center of the light reflection bottom face 30. An inner wall of the light source mounting hole is a light incident face 40. A lower edge of the light incident face 40 is connected to an inner edge of the light reflection bottom face 30.

A light exit convex point 11 protruding upwards is arranged at a center of the light exit top face 10, and a light incident convex point 41 protruding downwards is arranged at a center of the light incident face 40; wherein the light exit convex point 11 and the light incident convex point 41 diverge through refraction the light penetrating through the center of the lens body a, which prevents over-great luminance at the center of the lens body (a). Surfaces of the light exit convex point 11 and the light incident convex point 41 are all arc-shaped; wherein the arc surfaces may increase the divergence angle of the light exit convex point 11 and the light incident convex point 41 against the light.

A light reflection coating 12 is coated on a central surface of the light exit top face 10, wherein the light reflection coating 12 is provided with a plurality of light transmission holes 13. The light reflection coating 12 has a shape rotatably symmetric relative to a position of the light transmission hole 13 about the center of the light exit top face 10. The shape of the light reflection coating 12 and the position of the light transmission hole are arranged based on the intensity of the light penetrating through the light exit top face 10, such that the intensity of the light emitted from the light exit top face 10 is uniformly distributed as much as possible.

The light exit convex point 11 is covered by the light reflection coating 12 or inserted into the light transmission hole 13. In this embodiment, preferably the light exit convex point 11 is covered by the light reflection coating 12, such that the light is reflected to the light reflection bottom face 30 when penetrating through the light exit convex point 11, and is then further reflected by the light reflection bottom face 30. Nevertheless, a person skilled in the art would also insert the light exit convex point 11 into the light transmission hole according to the actual needs. That is, the light reflection coating does not cover the light exit convex point 11, such that the light is directly diverged when penetrating through the light exit convex point 11.

An arc-shaped recess portion 14 is arranged at the center of the light exit top face 10. The arc-shaped recess portion 14 is capable of further refracting the light emitted from the light exit top face 10 and then transmitting the light, which improves a divergence angle of the light exit top face 10 against the light, and makes light divergence more uniform. In addition, the light exit convex point 11 and the arc-shaped recess portion 14 cooperate with each other, such that the unnecessary free curved surface of the light exit top face 10 is reduced, and the light exit convex point 11 and the arc-shaped recess portion 14 are horizontally arranged. In this way, the thickness of the lens body a is reduced.

The light exit side face 20 is formed by a plurality of light exit flat faces 21 and a plurality of light exit arc faces 22 that are joined in an end-to-end fashion. In this embodiment, preferably the light exit side face 20 is formed by four light exit flat faces 21 and four light exit arc faces 22 in an end-to-end fashion. The light exit top face 10 and the light exit arc faces 22 form a positioning step 23, wherein the positioning step 23 is configured to mount and position the lens body a.

The light reflection bottom face 30 is provided with a plurality of Fresnel annular grooves 31 with the center of the light reflection bottom face 30 as a center of circle, wherein sparking textures (not illustrated in the drawings) are arranged on surfaces of the Fresnel annular grooves 31. The Fresnel annular grooves 31 reduce the unnecessary free curved surface of the light reflection bottom face 30 and are horizontally arranged, such that the thickness of the lens body a is reduced. In addition, the sparking texture is used for treating the stray light, such that the lens projects or emits uniform light spots.

The light incident face 40 is formed by a light incident top face 42 and a light incident side face 43. An upper edge and a lower edge of the light incident side face 43 are respectively connected to an outer edge of the light incident top face 42 and an inner edge of the light reflection bottom thee 30. The light incident convex point 41 is arranged at a center of the light incident top face 42. The arc-shaped light incident top face 42 and the light incident convex point 41 cooperate with each other, such that the light penetrating through the lens body a is refracted and diverges uniformly, which prevent over-great luminance at the center of the lens body a. The light incident side face 43 is configured to refract the stray light to the Fresnel annular grooves 31, such that the Fresnel annular grooves 31 further treat the light.

The light exit top face 10 is provided with a mounting blind hole 15, the light exit side face 20 is provided with a mounting step 24, and the light reflection bottom face 30 is provided with a mounting leg 32. The mounting blind hole 15, the mounting step 24 and the mounting leg 32 are all configured to mount the lens body a on a PCB board.

Figure 5:
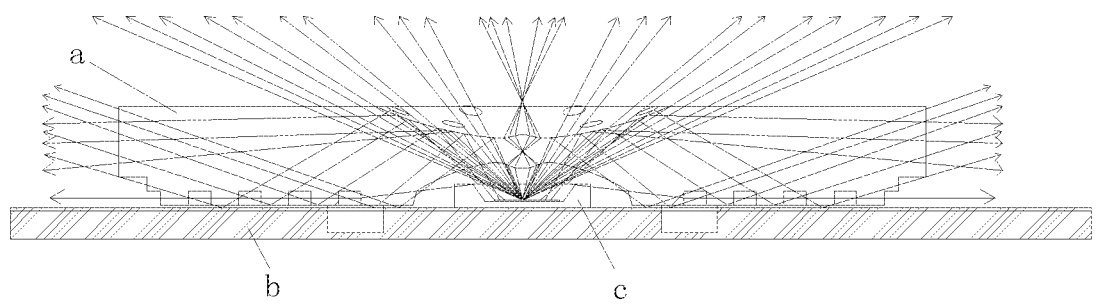
FIG. 5 is an optical path view When the ultra-thin backlight lens according to the embodiment of the present invention is used.

As illustrated in FIG. 5, the lens body a is mounted on a PCB board b, an LED lamp c is mounted at a center of a light source mounting hole of the lens body a, and the light diverges from the LED lamp c, is then refracted and reflected by the lens body a, and diverges from the lens body a.

Disclosed above are merely preferred embodiments of the present invention, and are not intended to define the protection scope of the present invention. Any equivalent variations or replacements made based on the claims of the present invention shall fall within the protection scope of the present invention.

What is claimed is:

1. An ultra-thin backlight lens, comprising: a lens body rotatably symmetric along a central axis, the lens body comprising a light exit top face and a light reflection bottom face that are horizontally arranged, and a light exit side face vertically arranged, an upper edge and a lower edge of the light exit side face being respectively connected to an outer edge of the light exit top face and an outer edge of the light reflection bottom face, a light source mounting hole being arranged at a center of the light reflection bottom face, an inner wall of the light source mounting hole being a light incident face, a lower edge of the light incident face being connected to an inner edge of the light reflection bottom face; wherein a light exit convex point protruding upwards is arranged at a center of the light exit top face, a light incident convex point protruding downwards is arranged at a center of the light incident face, and a light reflection coating is coated on a surface of a central region of the light exit top face, the light reflection coating being provided with a plurality of light transmission holes.

2. The ultra-thin backlight lens according to claim 1, wherein surfaces of the light exit convex point and the light incident convex point are all arc-shaped.

3. The ultra-thin backlight lens according to claim 1, wherein the light exit convex point is covered by the light reflection coating or inserted into the light transmission holes.

4. The ultra-thin backlight lens according to claim 1, wherein the light reflection coating has a shape rotatably symmetric relative to a position of the light transmission holes about the center of the light exit top face.

5. The ultra-thin backlight lens according to claim 1, wherein an arc-shaped recess portion is arranged at the center of the light exit top face.

6. The ultra-thin backlight lens according to claim 1, wherein the light exit side face is formed by a plurality of light exit flat faces and a plurality of light exit arc faces that are joined in an end-to-end fashion.

7. The ultra-thin backlight lens according to claim 1, wherein the light reflection bottom face is provided with a plurality of Fresnel annular grooves with the center of the light reflection bottom face as a center of circle, a sparking texture being arranged on surfaces of the Fresnel annular grooves.

8. The ultra-thin backlight lens according to claim 1, wherein the light incident face is formed by a light incident top face and a light incident side face, an upper edge and a lower edge of the light incident side face being respectively connected to an outer edge of the light incident top face and an inner edge of the light reflection bottom face; and the light incident convex point is arranged at a center of the light incident top face.

9. The ultra-thin backlight lens according to claim 1, wherein the light exit top face is provided with a mounting blind hole, the light exit side face is provided with a mounting step, and the light reflection bottom face is provided with a mounting leg.

* * * * *